United States Patent
Benson et al.

[15] 3,668,821
[45] June 13, 1972

[54] CUTTING AND WRAPPING MACHINE
[72] Inventors: Ernest J. Benson, Berkeley Heights, N.J.; Charles G. Fischer, Norwalk, Conn.
[73] Assignee: Benson Equipment Co., Inc., Berkeley Heights, N.J.
[22] Filed: June 2, 1970
[21] Appl. No.: 42,611

[52] U.S. Cl. ..................................53/123, 53/389, 83/320, 146/94 B
[51] Int. Cl. .......................................B65b 63/00
[58] Field of Search ..............53/23, 123, 179; 146/94 B; 83/320; 156/522

[56] References Cited

UNITED STATES PATENTS

| | | |
|---|---|---|
| 2,384,492 | 9/1945 | Rebechini..................................53/23 |
| 1,872,508 | 8/1932 | Schutz et al. ...........................83/320 |
| 3,537,497 | 11/1970 | Dickow et al.......................53/123 X |
| 3,455,770 | 7/1969 | Dahl ..................................156/522 X |

*Primary Examiner*—Travis S. McGehee
*Attorney*—Stefan J. Klauber

[57] ABSTRACT

This invention relates to an apparatus for wrapping shingled meat products with paper and then cutting the wrapped product in predetermined lengths. The shingled meat product is fed between two layers of wrapping paper and is then fed through a cutting mechanism which periodically moves at the speed of the fed paper and meat. A reciprocating blade on the cutting mechanism slices through the paper and meat at predetermined intervals leaving an individually wrapped portion ready to be stored or transported.

6 Claims, 5 Drawing Figures

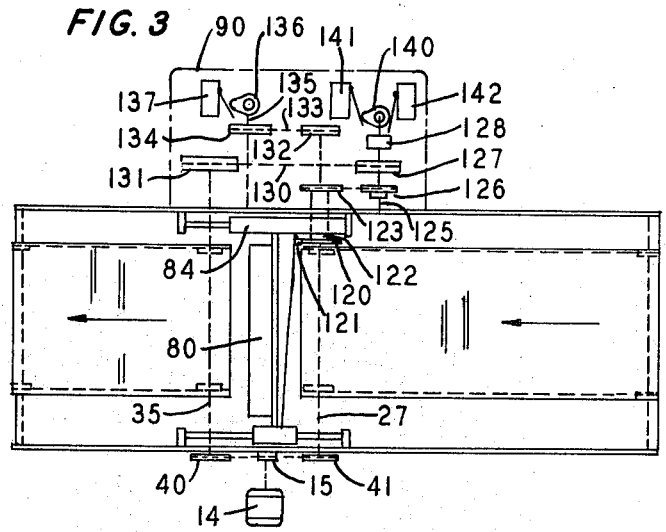
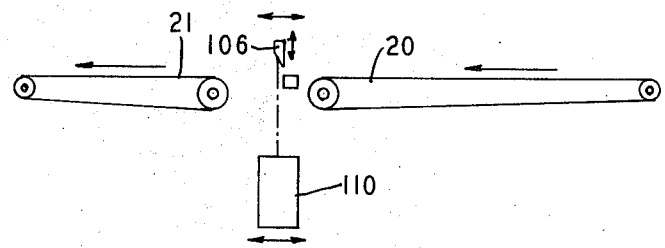
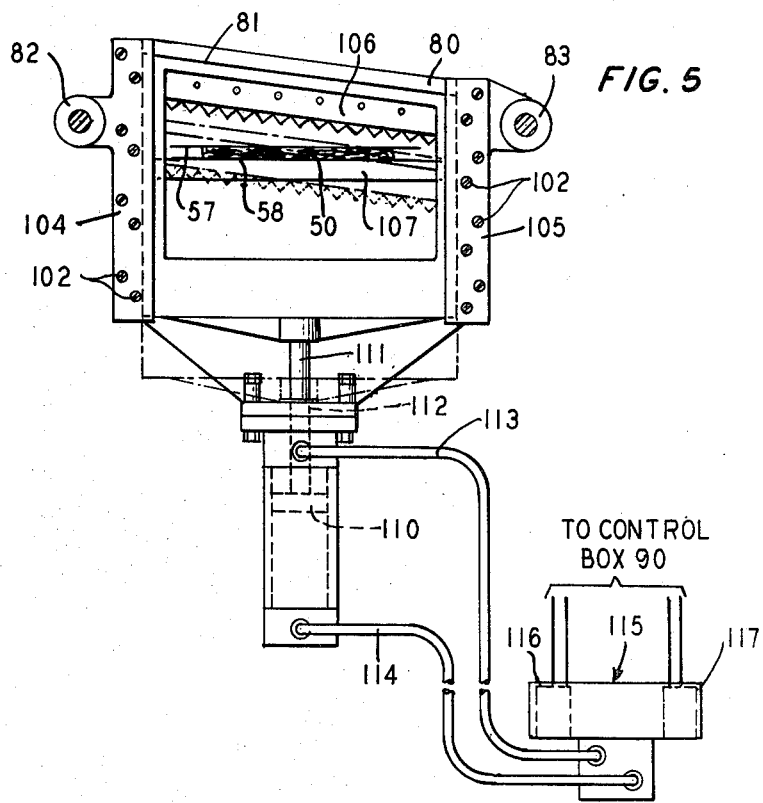

CUTTING AND WRAPPING MACHINE

This invention relates to a time and labor saving apparatus for wrapping and cutting portions of a food product.

This invention is especially suited for handling meat or other food products which are delivered from a slicing or cutting machine in a shingled array. Although this invention may be used with food products other than meats, for purposes of illustration this description will particularly refer to the processing of steak meat which is used in steak sandwiches. The invention was evolved as a result of difficulties in handling, wrapping and cutting steak meat used for steak sandwiches. It is recognized that the invention may be used for wrapping and cutting other food products and in fact the principles set forth herein may be applied broadly to wrapping and cutting and need not be confined to the food preparation field.

In various parts of the country, a hunger for steak sandwiches has made itself known. These sandwiches are generally sold for about 1 dollar or less. In view of the high cost of top grade steak meat, the vendors of such sandwiches usually use less expensive cuts of meat in the making of these sandwiches. It has been found that even less expensive cuts of meat can make an extremely tasty sandwich if the meat is prepared and cooked correctly. Experience has taught that the meat must be sliced thin and then a number of the pieces may be fried together on a griddle with a little cooking oil and onions etc. By using thin slices, the toughness and coarseness of the less expensive cuts is entirely overcome and the resulting cooked product has a distinctive character and taste all its own. The sandwich is quick to prepare on a short order basis and is both nourishing and highly enjoyable. The most popular form of the sandwich is served on an elongated bun which has been at least partially cut through to receive the cooked meat and any accompanying garnish, such as fried onions, peppers etc.

The nature of short order cooking requires that each individual portion be separately packaged and ready for cooking so that the cook need not make up portions as he goes along. The meat which forms the basis for the steak sandwich is no exception. If the thinly sliced meat were not in separately wrapped, measured portions, then a cook would waste a considerable amount of time in separating slices, measuring amounts, and arranging the meat for cooking.

Heretofore individually wrapped and measured portions of the sliced steak meat were prepared by hand in a time and labor wasting procedure, which will now be described. The meat was sliced in a slicing machine and then allowed to fall on a conveyor in a shingled array. A worker then removed a predetermined number of slices from the conveyor and then wrapped the slices in waxed paper which was precut to the desired size. Usually the meat slices were placed between two pieces of paper and then stacked in a box or other shipping container. Generally the meat was then frozen for storage and delivery. This procedure required a worker to continuously man the conveyor and continuously remove a desired number of slices for wrapping. Obviously the speed of the operation was determined by the worker and furthermore human error and fatigue often resulted in inaccuracy in the portions and a poorly wrapped and handled product.

The instant invention has substantially automated the measuring and wrapping phase of the above described operation. The invention works in conjunction with the conventional cutting machine and is adapted to receive the shingled steak and then wrap it, cut it into desired portion lengths and then deliver the portions to packing or storing equipment. It has been found that by using the invention, the speed of the total operation can be increased greatly.

It is accordingly an object of the present invention to provide a labor saving device suitable for use in the preparation of individual portions of a food product.

Another object of the invention is to provide a wrapping and cutting machine which will supply individual wrapped portions of predetermined length.

Another object of the invention is to provide a cutting machine which will cut a product which is being fed to it continuously.

A further object of the invention is to provide a cutting mechanism which will cut a continuously moving composite product, such as a meat product, between layers of waxed paper.

It is also an object of this invention to provide a wrapping mechanism which will continuously position wrapping material on opposite sides of a continuously moving shingled product.

This invention has other objects and features of advantage, some of which with the foregoing will be explained in the following description of that form of the invention illustrated in the drawings. It is understood that the invention is not limited to the embodiment shown in the drawing, but may be embodied in other forms as set forth in the claims.

In the drawings:

FIG. 3 is a diagrammatic view illustrating the drive for the conveyor belts and the cutting head;

FIG. 4 is a further diagrammatic view illustrating the operation and positioning of the cutter head and blade with respect to the conveyor belts; and FIG. 5 is an elevation of the cutter housing and assembly.

Figure 1:
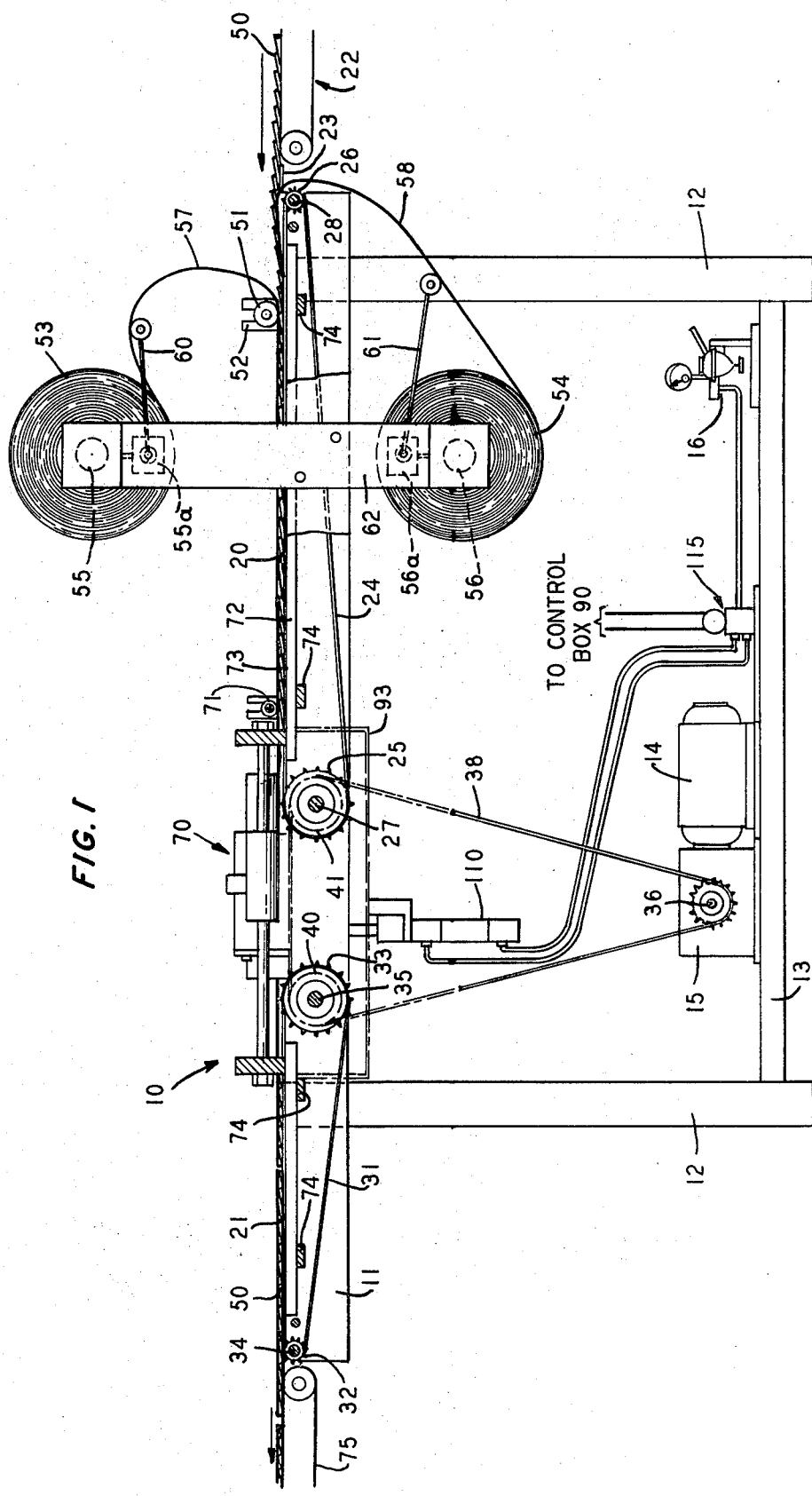
FIG. 1 is a side elevational view, partly broken away of a wrapping and cutting machine constructed in accordance with the invention.
Figure 2:
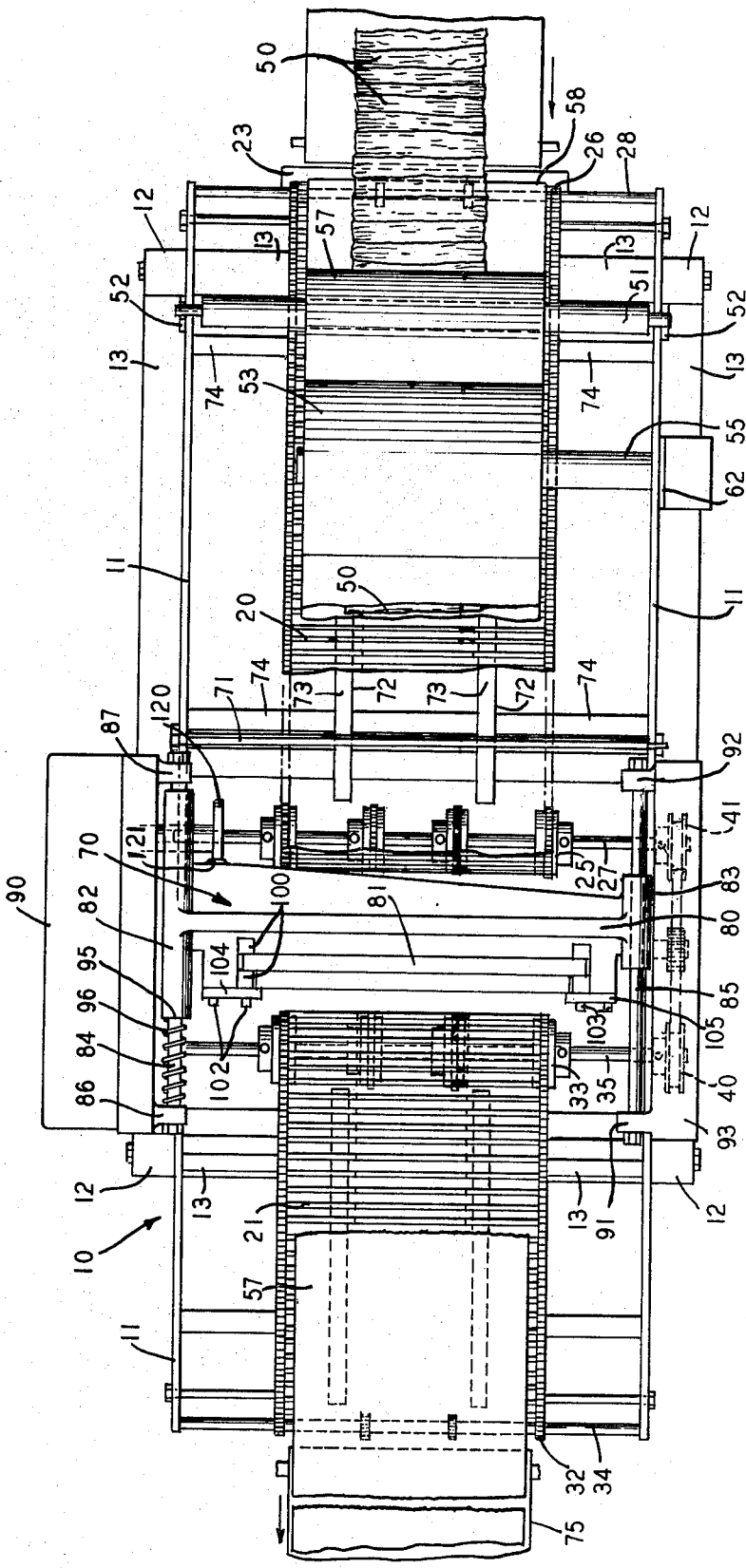
FIG. 2 is a plan view with parts omitted and partly broken away of the machine illustrated in FIG. 1.

The overall configuration of the wrapping and cutting machine 10 is illustrated in FIGS. 1 and 2. An elongated rectangular framework 11 is supported by four legs 12. The legs are suitably braced by crossmembers 13 which also serve as supports for the motor 14 and the drive gear assembly 15. The crossmember 13 also support the high pressure air inlet, regulators and gauge 16, which is used to supply air to an air actuated ram to be discussed below.

On the framework 11 there are mounted two conveyor systems indicated as 20 and 21. System 20 is positioned at the inlet end of the machine. It is adapted to accept food product from another conveying system 22 which for example might be associated with a slicing machine. The transition between system 22 and 20 might be made over a plate 23, which would serve to support the food product between the systems. Conveyor system 20 comprises an endless stainless steel wire conveyor 24 trained around sprocket wheels 25, 26 which are locked to shafts 27, 28. The shafts are mounted in bearings in the framework 11. Conveyor system 21 is similarly made up of an endless wire belt 31 trained around sprockets 32, 33 mounted on shafts 34, 35 which are in turn rotatably mounted in bearings in framework 11.

The drive for the conveyor systems is illustrated in FIG. 1. Motor 14 drives a shaft 36 through a gear box 15. A sprocket 37 is mounted on the shaft and drives a chain 38 which is trained around sprockets 40, 41 mounted on shafts 27 and 35. Sprockets 40 and 41 are of the same size and therefore the belt speed of belt 24 and belt 31 is the same.

Food product, which may be thinly sliced steaks in a shingled form, indicated as 50, passes from system 22 over plate 23 onto system 20. It initially passes under a gravity weighted roller 51 which is rotably and slidably mounted in supporting plates 52 affixed to framework 11. As the product passes under the roller it is also placed between layers of waxed paper 57, 58 or other suitable wrapping material. The paper is stored in rolls 53, 54 positioned on motor actuated shafts. The motors 55, 56 are actuated by trip levers 60, 61 which are pivotally mounted on an arm 62, which also serves to support the rolls 53, 54. The arm 62 extends above and below the framework 11 and is suitably bolted thereto. The levers 60, 61 are spring loaded to return to a normal position and are actuated by a predetermined increase in the tension of the paper feed.

The levers actuate solenoids 55a, 56a which in turn actuate the motors for driving the shafts 55 and 56. The motors are constant speed and are actuated periodically by the levers to maintain a continuous supply of paper to the conveyor system. Each motor operates independently and depends on actuation by its lever. When the tension decreases in the paper feed, the spring loaded lever returns to its off position and the paper feed motor stops. As indicated in FIG. 1 the paper 57 and 58 is also fed under the roller 51 and sandwiches the meat 50. The wrapped product is then transported by the conveyor 20 toward the area of the cutting mechanism 70. An additional roller 71 may be positioned over the conveyor 20 just before the cutting mechanism to insure that the layers of paper and meat are held tightly together immediately before the cutting operation.

Between the sprockets 25 and 26, the belt 24 is supported by two elongated flat members 72 having a Teflon or other suitable surface 73. These flat members are supported by cross members 74 connected to framework 11. System 21 has a comparable support system for the belt.

After the paper layers and the meat pass through the cutting mechanism 70 they are again supported by a conveyor system 21 which delivers them to the next step in the overall production process. This may take the form of another conveyor 75 or a stacking machine.

A description of the operation and structure of the cutting mechanism will now be given. The cutting mechanism is made up principally of a moveable cutter housing 80 which supports and guides a vertically reciprocating cutter assembly 81. As shown in FIG. 2 the housing 80 extends across the framework 11 and is positioned between the conveyors 20 and 21. The housing 80 is preferably formed from a single aluminum casting having cylinder like end members 82, 83 which have been drilled out to accept guide shafts 84, 85. The shaft 84 is mounted on lugs 86, 87 which are formed as part of the control box 90. The control box is affixed to the frame 11 by bolting and its function and content will be discussed below. The shaft 85 is mounted on lugs 91, 92 which are part of the housing 93 covering the sprockets 40, 41. The end member 82 is longer than the end member 83 and is provided with a surface 95 which is contacted by a return spring 96 positioned around the shaft 84 between the surface 95 and the lug 86. Note that when the housing 80 is moved to the left in FIG. 2 it will compress the spring 96. The size and strength of the spring 96 is chosen to provide a prompt and reliable spring return operation.

The housing 80 is formed with a vertically arranged opening to accept a cutter assembly 81. This assembly is positioned between sliding surfaces which are formed by, for example, Teflon blocks 100, 101 which are fixed in the housing. Adjusting screws 102, 103 which pass through supporting plates 104, 105 are used to adjust the pressure applied by the Teflon blocks and thus provide for wear take up. The plates are bolted to the housing 80.

An elevational view of the cutter housing and assembly is shown in FIG. 5. Both take the form of window like elements and are formed in this way so that the wrapped food product can pass through the housing and the assembly. Bolted to the upper part of the cutter assembly is a stainless steel serrated blade 106. As the assembly is reciprocated in a vertical direction, the blade moves up and down past the product being cut. The blade passes in close proximity to a contiguous cutting surface 107 on the housing. This last mentioned surface serves to support the product to be cut as it leaves this conveyor system 20 and keeps it at approximately the same level. It also provides the surface against which the blade 106 acts and thus the cutting action takes place between the blade 106 and the surface 107 in a scissor like action. If the surface 107 were not provided the blade 106 would merely drive the product to be cut downwardly and proper cutting would not take place. In the preferred embodiment the blade 106 is both angled to provide a scissor like action and serrated with a plurality of sharp points to provide many perforations in the waxed paper, from which perforations the actual cutting starts. It is well known that waxed paper is especially difficult to cut and this cutting difficulty is compounded when two layers of the paper are used to sandwich a layer of meat etc. By arranging the cutter assembly in the housing as described above a reliable cutting operation has been achieved. It has been found that after prolonged operation, the blade may wear down and it may then be either adjusted by its mounting bolts to tighten up the clearance or it may be replaced.

The cutter assembly is moved vertically by means of a two way pneumatic ram 110, the ram being mounted on the housing 80 for movement therewith. The ram operates a shaft 111 which is connected to the assembly 81. The shaft passes through an opening 112 which has been drilled in the housing 80. When the ram is actuated to drive the shaft 111 downwardly it serves to force the blade 106 in a downward direction through the product and past the surface 107. Once the cutting has been completed the ram is actuated to force the shaft 111 and the assembly 81 upwardly to its uppermost position. The control system for the ram will be discussed below. The ram 110 may be powered by other means such as a hydraulic or an electrical system however air is preferred, since it is clean, cheap and usually available in meat plants. The air lines indicated by 113, 114 are connected to a two position control valve assembly 115, which is controlled by solenoids 116, 117. The actuation of the ram 110 and its relationship to the movement of the cutter housing 80 will now be discussed. The control valve assembly is shown adjacent to the ram in FIG. 5 for purposes of illustration. Normally the control valve assembly is located on the lower frame 13 as shown in FIG. 1.

Since the product to be cut is being fed continuously through the cutting mechanism 70, it was found necessary to provide a cutting mechanism which would move along with the product at the same speed. If a stationary cutter were used, the product would pile up while the cutting action was taking place. The housing 80 is periodically moved along with the product at the same speed by means of a linear cam 120 which is rotatably mounted on shaft 27. The cam is designed so that it drives the housing 80 to the left in FIG. 2 at the same speed as the product. The cam acts against a cam follower 121 mounted on the housing. When the forward movement and the cutting action is completed, the spring 96 returns the housing 80 to the right in FIG. 2. The cam is cut so as to provide for a rapid return of the housing 80 under the spring force 96. It has been found that a single spring is sufficient to move the housing in the desired manner. If desired, another spring could be positioned on shaft 85 adjacent lug 91 to act against the housing. Care must be taken however not to use a spring force which will slam the housing back. This type of action is not desired since it causes excess wear of parts and is too noisey. In order to more clearly describe the workings of the actuating mechanism for the cam 120 and the ram 110, reference may be had to the schematic showing in FIG. 3 of the drawing. The reference numerals applied previously are also applied to FIG. 3. Shafts 27 and 35 are fixed to sprockets 40 and 41 respectively and are driven thereby in the same direction of rotation. These shafts drive sprockets which drive the belts in the directions indicated.

Cam 120 is fixed on a hub 122 which is rotatably mounted on shaft 27. The hub is provided with a sprocket 123 which if rotated causes the hub and associated cam to rotate about the shaft 27 and thus cause the cutter housing to slide forward. Positioned in close proximity to shaft 27 is another shaft 125. A sprocket 126 is fixed to this shaft and a suitable endless chain is trained around the sprockets 126 and 123. The rotation of shaft 125 is in turn controlled by an electrically controlled clutch 127 and brake 128. The driving force for shaft 125 is provided through belt 130 trained around a hub associated with the clutch mechanism and a pulley 131 fixed to shaft 35. If the clutch is actuated and the brake is off the shaft 125 will rotate and if the brake is engaged and the clutch disengaged it will prevent the rotation of the shaft 125. The mechanism for actuating these elements will now be described. Fixed to shaft 27 is a pulley 132 which drives a timing belt 133 trained around another pulley 134 fixed to a shaft 135. A cam 136 is mounted on the shaft 135 and rotates therewith. The cam actuates an electrical switch 136 which releases brake 128 and engages the clutch 127. The clutch and brake are preferably of the electro-magnetic variety and since their details of construction are not part of the instant invention they will not be described in detail. Both the clutch and brake are items which are readily available from a number of commercial sources.

It is apparent that the ratio of the pulley sizes 132, 134 determines the frequency of movement of the cutter housing 80 and thus the cutting interval of the apparatus. A one to one ratio results in a cut for each revolution of shaft 27. A one to two ratio would result in two cuts for every revolution of shaft 27. The length of cut depends also on the circumference of the belt drive sprockets 40, 41. Thus by varying the ratio of the pulleys 132, 134 any desired length of cut can be obtained.

Cam 140 is attached to shaft 125 and serves to actuate switch 141 upon the completion of one revolution of shaft 125. The switch 141 then releases the clutch 127 and engages the brake 128. During this one revolution of shaft 125, the cutter housing 80 is moved forward under the action of cam 120 and back to its rest position under the action of spring 96. As mentioned above the cam 120 is cut so that the housing 80 moves at the speed of the product. During the forward movement, cam 140 actuates switch 142 which is connected to and in turn controls the solenoids 116, 117 which actuate the ram 110 and then returns the ram to its normally raised position. The details of the switch structure forms no part of this invention and therefore no elaborate description need be given. These devices are available commercially. The cutting action of the blade 106 therefore takes place as the cutter housing is moving forward with the product to be cut. Substantially all of the brake, clutch, cam and shaft structure is located in the control box 90. This box also contains controls for starting and stopping the drive motor 14. Preferably motor 14 is a variable speed motor so that belt speed can be varied to obtain the desired performance from the machine. In order to simplify this illustration the electrical connections between the switches, solenoids, clutch, brake and power source are not shown in detail.

It is also within the scope of this invention to provide a means to vary the length of cut by means of a suitable control, such as a dial, on the control box 90. Thus instead of using a timing belt trained around pulleys 132 and 134 any suitable multi-speed transmission could be used to connect shaft 27 with shaft 135 and thus allow the speed of shaft 135 to be changed as desired by the operator.

In the event the cutting mechanism is reciprocated at high speed, it may be found that the spring 96 is unable to return the mechanism quickly enough. If this occurs the function of the spring may be replaced by providing a cam 120 which will not only drive the mechanism to the left, as shown in FIG. 3, but which will also serve to move the mechanism to the right. This can be accomplished by placing the cam in a cam follower.

FIG. 4 illustrates in schematic form the relative movement of the cutter housing and of the cutter blade.

Although only certain and specific embodiments of the present invention are shown, it is to be expressly understood that many modifications are possible without departing from the true spirit of the invention.

What we claim is:

1. An apparatus for cutting product into predetermined lengths comprising first conveyor means adapted to carry the product at a desired speed, a second conveyor means spaced from said first means, and adapted to receive product from said first conveyor means, cutting means at least partially positioned between said first and second conveyor means, said cutting means having supporting means for supporting the product as it passes from the first conveyor means to the second conveyor means, means to periodically move said cutting means in the direction of movement of said product and at substantially the speed of the product, said cutting means having a cutting blade and actuating means to move said blade through said product while said cutting means is moving with the product, means to apply at least one layer of wrapping material to one side of the product as it transits said first conveyor means, and automatic feed means to continuously supply the wrapping material to the product, said feed means including tension responsive means to detect an insufficient supply of wrapping material and a motor driven supply spool storing said wrapping material, said tension responsive means serving to actuate said motor driven supply spool upon detecting an insufficient supply of wrapping material.

2. An apparatus as defined in claim 1 further comprising guide means on which said cutting means is mounted for reciprocating movement, said means to move said cutting means including a cam which is periodically actuated to move said cutting means on said guide means and spring return means on said guide means to return said cutting means following movement by said cam, said blade being mounted for vertical reciprocation to effect said cutting, and said actuating means comprising a ram for effecting said reciprocation of said blade in response to timing signals provided thereto, and further including second cam means timed in accordance with the advance of said product, for providing said timing signals.

3. An apparatus as defined in claim 2 in which said blade is serrated and angled with respect to the product so that the product is cut initially at one edge thereof, said serrations causing perforations in said product from which perforations the cutting progresses.

4. An apparatus for cutting product into predetermined lengths comprising first conveyor means adapted to carry the product at a desired speed, a second conveyor means spaced from said first means, and adapted to receive product from said first conveyor means, cutting means at least partially positioned between said first and second conveyor means, said cutting means having supporting means for supporting the product as it passes from the first conveyor means to the second conveyor means, means to periodically move said cutting means in the direction of movement of said product and at substantially the speed of the product, said cutting means having a cutting blade and actuating means to move said blade through said product while said cutting means is moving with the product, means to apply layers of wrapping material to two sides of the product as it transits said first conveyor means, and automatic feed means to continuously supply the wrapping material to the product, said feed means including tension responsive means to detect an insufficient supply of wrapping material and motor driven supply spools storing said wrapping material, said tension responsive means serving to actuate said motor driven supply stools upon detecting an insufficient supply of wrapping material.

5. An apparatus for cutting product into predetermined lengths comprising first conveyor means adapted to carry the product at a desired speed, a second conveyor means spaced from said first means, and adapted to receive product from said first conveyor means, cutting means at least partially positioned between said first and second conveyor means, said cutting means having supporting means for supporting the product as it passes from the first conveyor means to the second conveyor means, means to periodically move said cutting means in the direction of movement of said product and at substantially the speed of the product, said cutting means having a cutting blade and actuating means to move said blade through said product while said cutting means is moving with the product, means to apply layers of wrapping material to two sides of the product as it transits said first conveyor means, and means to feed the product to the first conveyor means in a shingled array, said wrapping material being applied to both sides of said shingled array and means to compress said wrapping material and product prior to it being cut.

6. An apparatus as defined in claim 3 in which said cutting blade acts in conjunction with said supporting means so as to cut said product in a scissor-like action.

* * * * *